United States Patent [19]
Perlick

[11] 3,718,190
[45] Feb. 27, 1973

[54] LANDSCAPING IMPLEMENT

[76] Inventor: Allan A. Perlick, 1635 N.E. Fourth Place, Fort Lauderdale, Fla.

[22] Filed: Oct. 21, 1970

[21] Appl. No.: 82,663

[52] U.S. Cl. ............172/173, 172/180, 172/198, 172/200, 172/247
[51] Int. Cl. .......................................A01b 5/00
[58] Field of Search .....37/117.5; 172/133, 136, 145, 172/146, 149, 150, 168, 170, 171, 173, 174, 175, 179, 180, 184, 195, 197, 198, 199, 200, 247, 276, 518, 734, 785

[56] References Cited

UNITED STATES PATENTS

| | | | |
|---|---|---|---|
| 471,341 | 3/1892 | Harvey | 172/150 X |
| 862,718 | 8/1907 | Davis | 172/197 X |
| 1,198,684 | 9/1916 | Waugh et al | 172/150 X |
| 1,564,577 | 12/1925 | Kelnhofer | 172/785 |
| 2,868,306 | 1/1959 | Key | 172/200 |
| 2,997,115 | 8/1961 | Moser | 172/199 X |
| 3,033,394 | 5/1962 | Kashergen | 37/117.5 |
| 3,287,834 | 11/1966 | Hopkins | 172/247 |
| 3,440,744 | 4/1969 | Smith | 37/117.5 |
| 3,448,814 | 6/1969 | Bentley et al | 172/146 |
| 3,586,111 | 6/1971 | Jackson | 172/200 X |

*Primary Examiner*—William B. Penn
*Assistant Examiner*—Eugene H. Eickholt
*Attorney*—Eugene F. Malin

[57] ABSTRACT

A multi-purpose landscaping implement able to perform simultaneous functions of rolling, raking, pulverizing, and leveling of soil attachable for use on a hydraulic shovel lift or the like of a landscaping vehicle. The amount of weight required for the rolling operation is reduced by using a portion of the weight of the working vehicle.

4 Claims, 3 Drawing Figures

PATENTED FEB 27 1973  3,718,190

INVENTOR.
ALLAN A. PERLICK
BY
ATTORNEY 3,718,190

LANDSCAPING IMPLEMENT

BACKGROUND OF THE INVENTION

The introduction of mechanization into landscaping techniques has brought forth a plethora of landscaping implements that perform specific functions on the soil. Tractors or tractor-like vehicles have become the backbone of such mechanization techniques. In order to properly prepare soil for planting, several different operations must be performed on the soil such as pulverizing, leveling, and rolling. In the past, these operations have been done independently using some mechanized means, such as a tractor, which required having several different pieces of equipment, each of which would be dragged behind the tractor during each operation. Also very heavy rollers were required to properly flatten the surface and pack it. Applicant's invention eliminates these problems by providing a multifunctional landscaping implement that is attachable to the shovel lift of a tractor and is able to perform the functions of pulverizing, leveling, and rolling with a reduced size roller. Forward operation is provided thus allowing better visibility for the tractor operator while performing the landscaping work.

BRIEF DESCRIPTION OF THE INVENTION

A landscaping implement to be used in conjunction with a tractor hydraulic lift or the like having a roller means, a soil leveling means, and a rake shaped soil pulverizing means coupled together in line and joined by an I-beam supporting structure. When attached to and properly oriented with respect to the hydraulic lifting means, the implement can add the weight of the tractor to the roller or pulverizing means by orienting the lifting device so that the front wheels of the vehicle are raised above the ground and front load is supported on the implement. The implement's angular orientation with the ground provides for pulverizing, grading, and rolling operations to be simultaneous performed in front of the vehicle, so that the operator can observe all these operations while at the same time maintaining control of the vehicle.

It is an object of this invention to provide a landscaping implement capable of simultaneously pulverizing, leveling, and rolling soil.

It is another object of this invention to provide a landscaping implement that may be attached to a shovel system commonly found in tractor vehicles and the like for controlling the landscaping implement.

It is yet another object of this invention to provide a landscaping implement used as a roller in which the vehicle weight can be used to increase the ground rolling pressure.

And yet still another object of this invention is to provide a landscaping implement that may be easily attached to the front of a landscaping vehicle which allows the operator the ability to look forward during landscaping operations while maintaining control of the vehicle.

And still yet another object of this invention is to provide for the simultaneous rolling, grading, pulverizing of the soil with a single control device.

In accordance with these and other objects which will be apparent hereinafter, the instant invention will now be shown with particular reference to the accompanying drawing.

PREFERRED EMBODIMENT OF THE INVENTION

Figure 1:
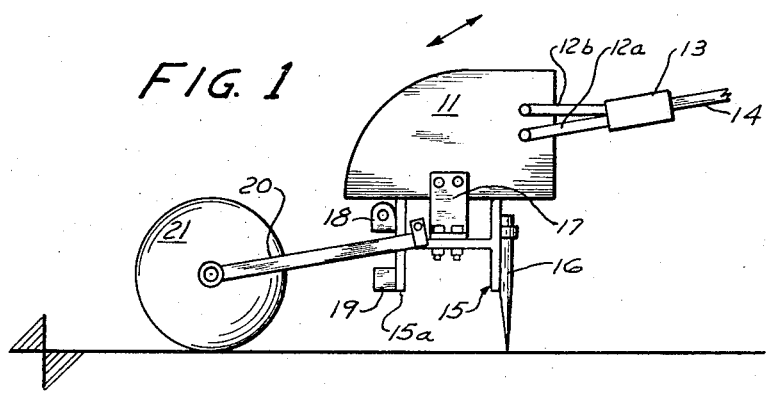
FIG. 1 is a side prospective view showing applicant's invention coupled to a tractor shovel.

Referring now to the drawings, and especially FIG. 1, applicant's invention is shown coupled to a representative tractor shovel 11. The shovel can be moved rotationally and horizontally and vertically by proper control of connecting arms 12a, 12b, and 14 in conjunction with hydraulic lift unit 13. During normal shoveling operations, applicant's invention would not be coupled to the shovel 11. However when it is desired to pulverize, scrape, and roll a soil surface, applicant's invention is coupled to shovel 11 by connecting braces 17. The connecting braces, only one side showing in FIG. 1, are bolted to the shovel sides 11 in a standard manner. The basic structural unit of applicant's invention is I-beam 15. Coupled to the I-beam are large spike-shaped teeth 16, their purpose being to plow and turn up the soil. In the center, an axle couples I-beam 15 to long arms 20 rotatably about the middle section of I-beam. The opposite end of each arm 20 is rotatably coupled to a roller 21. In FIG. 1, the implement is shown in a rolling only position, the rake teeth 16 being above the soil. I-beam projecting member 15a acts as a scraping surface means for leveling pulverized soil. Thus, roller 21 accomplishes rolling while I-beam projecting member 15a performs scraping functions, and raking teeth to provide a raking function. I-beam member is sized so as to fit snuggly along its top edges shown in FIG. 1 underneath the shovel bottom. This allows for the firm coupling of the implement to the shovel. Supporting plate 17 is also bolted into the midsection of the I-beam on each side. Different adjusting holes may be provided in the I-beam center to allow for different sizes of the shovel width. The I-beam member is intended to be wider than the shovel width, thus allowing the supporting arms 20 to move freely without interfering with the shovel or coupling mechanism.

Figure 2:
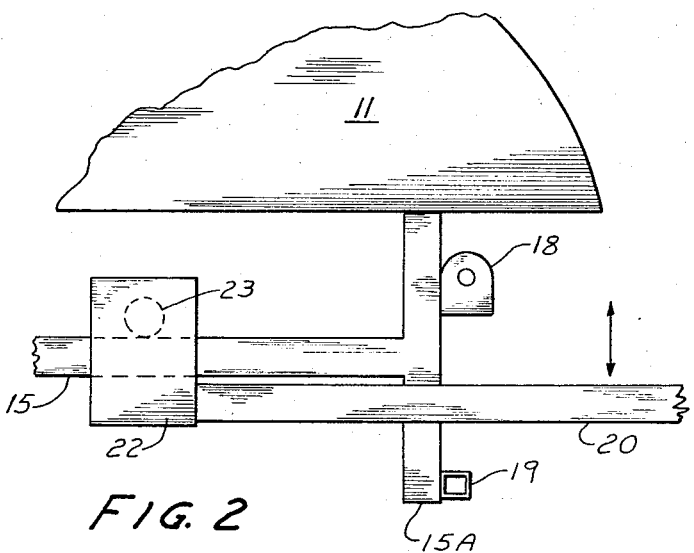
FIG. 2 is a partial elevation of the roller support mechanism of applicant's invention.

FIG. 2 shows a close-up of the roller supporting bar 20 and associated rotating axis 23 coupled to the I beam 15. The supporting structure of coupling bar 17 is not shown in FIG. 2 for simplicity. Welded to the top of the midsection of I-beam 15 is a cylindrical bar 23 that acts as an axle 23 which is rotatably coupled to a structure plate 22. Attached to structure plate 22 is the roller control arm 20 (one on each side) which allows roller movement around axis 23 as indicated by the arrows in FIG. 2. Above the roller control arm 20 and coupled to the front side of I-beam 15 is an upper limiting member 18 which prevents and limits the upward position of the roller support bar 20. Likewise, lower limiting member 19 prevents bar 20 from moving below the bottom edge of the I-beam 15. By limiting the travel of the roller control arm 20 between stops 18 and 19, the shovel and consequently the I-beam 15 can be tilted by a hydraulic control system on a tractor or the like to provide different operating modes of the implement.

Figure 3:
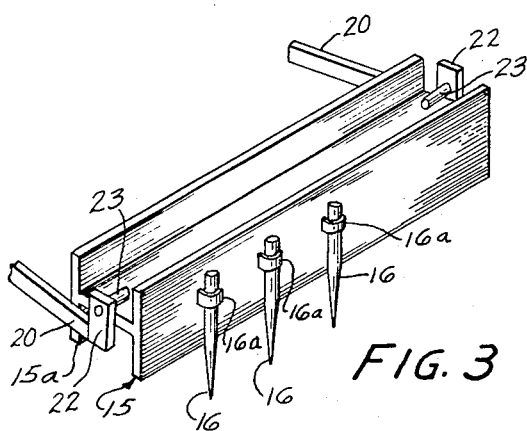
FIG. 3 shows a back prospective view of the main structural member of applicant's invention.

FIG. 3 shows the back portion of I-beam 15 with the bracing teeth members 16 held by coupling bands 16a. The teeth may be attached to the bar in any standard manner that is well-known in the art, such as bolting, that would insure necessary strength for pulverizing and raking operations.

In operation, the implement may be used to provide individual rolling, raking, and leveling or scraping or any combination of these operations by providing the proper tilting angle and height of the shovel and consequently the I-beam member with respect to the soil surface and the roller support arms. For example, returning to FIG. 2, the shovel 11 could be positioned so that the raking teeth 16 protrude into the ground but tilted sufficiently so that surface 15a is not touching the soil. Also, the I-beam may be horizontally disposed of as shown in FIG. 2 with the spike teeth into the soil while scraping surface 15 is also leveling the top of the soil surface. Single rolling operation alone can be accomplished by raising the scraping surface of the raking teeth above the soil level and tilting the bucket downward thus causing arm 20 to rotate in an upward direction until it is resting against stop 18. Continuing further downward force on the bucket 11 from the hydraulic control mechanism will cause the forward vehicle end to be lifted off the ground so that the entire forward vehicle weight will now be transmitted through the rolling device 20. This allows for the use of a lighter roller to achieve the same packing force pressure on the soil since the added weight of the vehicle on the forward can be positioned and thrust through this rolling surface. Also, by tilting the shovel and I-beam upwardly in the forward direction, the roller can be lifted entirely off the ground with the roller support arms 20 resting on stop 19 which will prevent arm 20 from rotating down to the ground level while at the same time allowing the teeth 16 to be employed in a raking pulverizing manner to loosen the soil.

The instant invention has been shown and described herein in what is considered to be the most practical and preferred embodiment. It is recognized, however, that departures may be made therefrom within the scope of the invention and that obvious modifications will occur to a person skilled in the art.

What I claimed is:

1. A soil conditioning implement for coupling with a landscaping vehicle such as tractor or the like, comprising, the improvement of:

a supporting member;
means connected to said supporting member for coupling said supporting member to said vehicle;
raking means coupled to said supporting member, said raking means including a plurality of spiked-shaped teeth members, and a bolting means coupling the teeth to said supporting member,
soil leveling means along a first edge of said supporting member, said supporting member being an I-beam having a middle section, said leveling means being a first edge of said I-beam, and said raking teeth members being coupled to said second edge of said I-beam;
ground rolling means;
rotatable coupling means coupling said rolling means to said supporting member to adjust the relative position of said rolling means axis with respect to the displacement axis of said supporting member;
a first stopping means fixed in a first position on said supporting member; and
a second stopping means positioned in a second position on said supporting member, said first and said second stopping means positioned to limit the vertical displacement of said means coupling said rolling means to said support member, whereby said rolling means is vertically positionable between said first and second position with respect to said supporting member.

2. An implement as in claim 1, whereby said rotatable coupling means includes:
a pair of arms each coupled at opposite ends of said rolling means at their first ends and to the I-beam supporting member at their second ends; rotatable axle means coupled to said I-beam middle section and said each arm second end whereby said arms are rotatable in a vertical plane.

3. An implement as in claim 2, wherein said vehicle includes:
a power driven control unit on said vehicle connected to said supporting member whereby the supporting member can be moved vertically and horizontally by said control unit.

4. An implement as in claim 3 including:
structural means for positioning the implement in front of the vehicle, whereby the implement is positioned in front of the vehicle so that the operator can observe the implement when the vehicle is proceeding in a forward direction.

* * * * *